Feb. 20, 1923.
J. W. BURKE.
METHOD OF MARKING TIRES.
FILED APR. 26, 1922.
1,445,745.
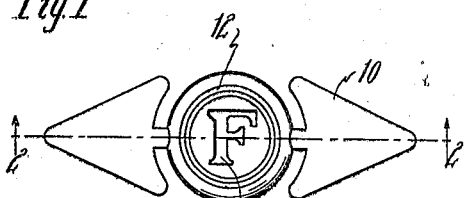
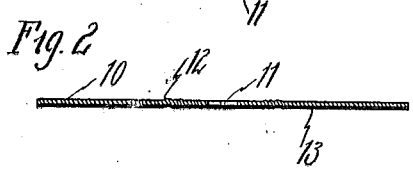
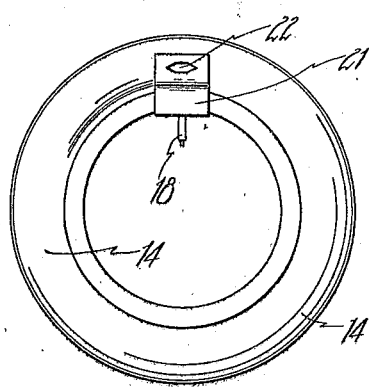
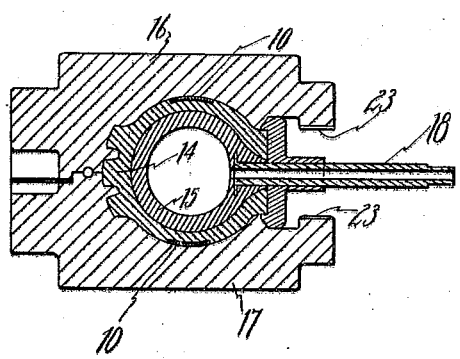
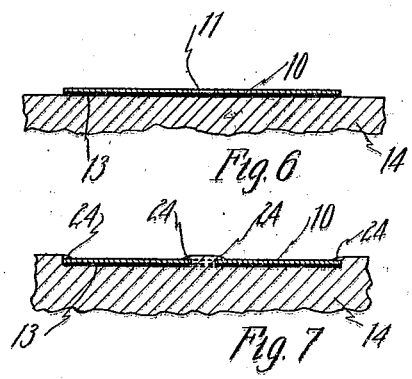
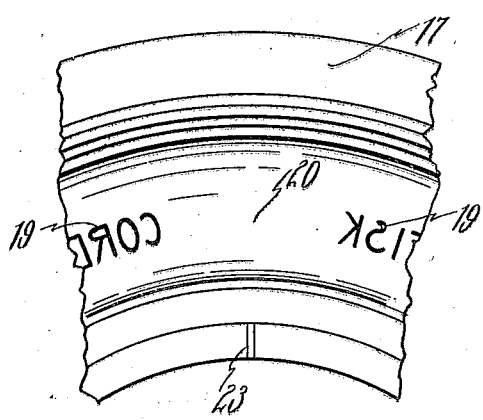
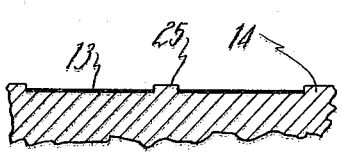
INVENTOR
John W. Burke
BY
ATTORNEY Patented Feb. 20, 1923.

1,445,745

UNITED STATES PATENT OFFICE.

JOHN W. BURKE, OF CHICOPEE FALLS, MASSACHUSETTS, ASSIGNOR TO THE FISK RUBBER COMPANY, OF CHICOPEE FALLS, MASSACHUSETTS, A CORPORATION OF MASSACHUSETTS.

METHOD OF MARKING TIRES.

Application filed April 26, 1922. Serial No. 556,673.

*To all whom it may concern:*

Be it known that I, JOHN W. BURKE, a citizen of the United States of America, residing at Chicopee Falls, in the county of Hampden and State of Massachusetts, have invented certain new and useful Improvements in a Method of Marking Tires, of which the following is a specification.

My invention relates to the marking of rubber articles, particularly tire casings. It has for its object the improvement in the appearance of the mark produced, the increasing of the accuracy with which the mark can be located on the article, the facilitating of the marking operation in general, and the improvement of the product and process in various particulars which will more fully appear from the description and claims.

The invention will now be described in connection with the accompanying drawings, in which Fig. 1 is a view of a transfer member used in carrying out the process;

Fig. 2 is a section thereof on line 2—2 of Fig. 1;

Fig. 3 is a side view of a tire casing illustrating one method of locating the transfer member thereon;

Fig. 4 is a section of a mold showing the tire with the transfer member upon it during vulcanization;

Fig. 5 is a fragmentary plan view of one of the mold sections;

Fig. 6 is a section corresponding to Fig. 2 on a smaller scale, showing the transfer member applied to the article, but before vulcanization;

Fig. 7 is a similar view after vulcanization;

Fig. 8 is a similar view with the article buffed and the transfer member removed; and Fig. 9 is a fragmentary section of a modified form of transfer member.

In the marketing of rubber articles such as tire casings it is desirable in some instances to have placed upon the article a distinctive marking in a different color from the rest of the article. By my invention I am enabled to secure the effect of a mark standing out in two colors from the rest of the article, and to locate this marking accurately with respect to lettering or the like which may also appear on the article.

To accomplish this I make use of a transfer member 10, formed in the shape of the mark desired, having an aperture 11 in the form of the contrasting color design desired. The member 10, which is conveniently formed of stamped sheet metal, may have portions 12 in relief to produce a corresponding effect upon the finished marking. One side of the member is now coated with a coloring material such as a rubber cement 13 of a composition suited to vulcanize with the rubber of the article, and this cement allowed to dry. The transfer member is now ready for application to the article.

In the usual vulcanizing practice for cord tires, which may be taken as an example here, the tire casing 14 is stretched by an expansible air or water bag 15 into an annular mold comprising mating sections 16 and 17, fluid under pressure being admitted to the interior of the bag through a valve stem 18. In the marking of pneumatic tire casings, and especially in the case of cord tires, which are the higher grade and higher priced article, it is important for reasons of appearance to have the distinctive colored marking located accurately with respect to the other marking in the mold in which the tire is vulcanized. Numerous legends are usually molded on the finished tire, such as the maker's name, the size of the tire, and other advertising and descriptive matter. Some of this lettering, appearing in inverse form on the molding cavity of the mold section 17, is indicated by 19 in Fig. 5. In the example taken for illustration, it is assumed that the colored mark is desired to be located symmetrically in the space 20 between the lettering shown.

The cord tire is chosen as a species for illustration because of the importance of accurate marking, but it should be understood that the invention is not limited to tires of this type. Mention is made of this point here because of the fact that in cord tire marking it is found convenient to make use of the valve stem 18 as a guide in locating the colored mark on the tire. In case a fabric tire is in question an air bag is not usually employed, and some part of the internal core or the tire itself must be substituted in its place.

In marking tires which are vulcanized upon an air bag, a convenient manner of locating the transfer member upon the tire comprises applying to the tire a template 21, located as by means of a hole through which the valve stem 18 is adapted to pass, and provided with an aperture 22 substantially conforming to the shape of the transfer member. Two methods of locating the member by this template may be employed— in one case the member being applied to the tire through the hole in the template; and in the other case a mark being made on the tire through the aperture in the template, to which mark the transfer member is later fitted. Other devices may be employed for applying the transfer member if desired. For example, I contemplate the use of a carrying device adapted to be located either by the valve stem or some other point on the tire, and to carry and press the member directly against the tire. The main point, however, no matter what device is used, is to locate the transfer member on the raw tire casing in a position which bears a definite relation to some other point on the tire which can be located with respect to the vulcanizing mold. As the transfer member itself is not visible to the operator in closing the vulcanizing mold, it is necessary to do the actual locating in the mold from some other point as a base, and the valve stem 18 furnishes a convenient visible point for this purpose.

To cooperate with the valve stem in assisting the operator in properly registering the tire, now with the transfer member upon it, within the opposed mold sections 16 and 17, these sections have been shown as provided with notches or grooves 23 by which the operator can visually determine the alignment of the molds and the valve stem. A stripe of paint or other mark could be substituted if desired. As shown, the notches and valve stem are in radial alignment with the marking which is to be placed on the tire, but this is not essential, the main consideration being that the relation between these elements is such that when the tire is placed in the mold the transfer member 10 will lie in proper registration with the location 20 in the mold corresponding to the correct relation of the distinctive mark to the lettering and other marking on the tire.

With the transfer member thus located on the tire and registered in the mold the tire is subjected to vulcanization in the usual way, with fluid pressure supplied through stem 18. The combined action of the heat and pressure is to cause the transfer member to be pressed into the side of the tire as indicated by the change of position between Figs. 6 and 7. The depth to which the transfer member is pressed has been exaggerated in the latter figure in order to show more clearly the slight overlap of rubber 24 that extends over onto the surface of the transfer member from the surrounding mass of rubber. With a thin transfer member I have found that this overlapping does not occur to so great an extent and the marking produced is very sharp. If overlapping does occur it is desirable to buff the tire in the neighborhood of the colored marking before removing the transfer member, as the latter gives protection to the coloring. When the transfer member is finally removed the effect indicated in Fig. 8 is produced, in which the coloring matter 13, now firmly bonded to the rubber 14 of the tire by the vulcanization, is recessed in the body of the tire an amount corresponding to the thickness of the transfer member used, and a sharply defined central marking 25 corresponding to the aperture 11 in the transfer member stands out from the rest of the marking on account of being in a contrasting color. The production of a contrasting color effect by this means has not as far as I am aware been accomplished prior to the present invention and is of great utility in producing with cheapness and accuracy a mark having distinctive individual characteristics.

I have found that, particularly if a transfer member of fairly thick material is used, the layer 13 of cement is better retained during vulcanization by having the surface of the member upon which the cement lies slightly concave. A transfer member of this character can be readily manufactured by having the sheet material punched out into form, the slight burr 26 (Fig. 9) resulting from the punching being generally sufficient for the purpose.

Having thus described my invention, I claim

1. The method of marking rubber goods comprising applying a coloring material to a transfer member, locating the transfer member upon the unvulcanized article in a definite relation to a base point, placing the article with the transfer member thereon in a mold having markings for impression upon the article, with the base point on the article registered with respect to a base point on the mold, the latter point being so situated that with the tire so registered the transfer member will lie in proper registration with the mold marking, and vulcanizing the article, whereby a combined molded and colored marking is produced upon the article with the desired registration between them.

2. The method of producing a distinctive colored marking upon a rubber tire which comprises applying a coloring material to a transfer member, locating the transfer member upon the unvulcanized tire in a definite relation to a base point, placing the tire with the transfer member thereon between the sections of a vulcanizing mold having markings for impression upon the tire, with the base point on the article registered with respect to base points on the mold sections, the latter points being so situated that with the tire so registered the transfer member will lie in proper registration with the mold marking, and vulcanizing the tire, whereby a combined molded and colored marking is produced upon the tire with the desired registration between them.

3. A method of producing a distinctive colored marking upon a tire casing which comprises mounting the casing upon an internal support, applying a coloring material to a transfer member, locating the transfer member upon the tire in a predetermined position with respect to a base point on the internal support, placing the tire with the transfer member thereon between the sections of a vulcanizing mold having markings for impression upon the tire, with the base point on the internal support registered with respect to base points on the mold sections, the latter points being so located that with the internal support so registered the transfer member will be in proper registration with the mold marking, and vulcanizing the tire while compressed between the internal support and the mold sections, whereby combined molded and colored markings are produced upon the tire with the desired registration between them.

4. The method of producing a distinctive colored marking upon a rubber article comprising applying a vulcanizable coloring material to the article, locating the article in a lettered vulcanizing mold with the coloring material in predetermined registration with the lettering, and vulcanizing the article.

5. The method of producing an embossed two-color distinctive marking on a rubber article comprising applying to a transfer member a coloring material adapted to vulcanize in a color contrasting with the color of the article, said member having an aperture therein, pressing the member upon the article and subjecting the member and article to vulcanizing heat to force the rubber of the article through the aperture, buffing off the rubber which has flowed over upon the outer surface of the member, and then removing the member, whereby a marking is produced having a central raised portion of the color of the rubber of the article with a surrounding depressed design in a contrasting color.

6. The method of producing a two-color distinctive marking on a rubber article comprising applying to a transfer member a coloring material adapted to vulcanize in a color contrasting with the color of the article, said member having an aperture therein, pressing the member upon the article and subjecting the member and article to vulcanizing heat to force the rubber of the article through the aperture, buffing off the rubber which has flowed over upon the surface of the member, and removing the member, whereby a marking is produced having a central portion of the color of the rubber of the article with a surrounding design in a contrasting color.

7. The method of producing a two-color distinctive marking on a rubber article comprising applying to a transfer member a coloring material adapted to vulcanize in a color contrasting with the color of the article, said member having an aperture therein, pressing the member upon the article and subjecting the member and article to vulcanizing heat, and removing the member, whereby a marking is produced having a central portion of the color of the rubber of the article with a surrounding design in a contrasting color.

8. The method of producing a two-color distinctive marking on a rubber article comprising applying to a transfer member a vulcanizable rubber cement of a color contrasting with the color of the article, said member having an aperture therein, allowing the cement to dry, pressing the member upon the article and subjecting the member and article to vulcanizing heat, and removing the member, whereby a marking is produced having a central portion of the color of the rubber of the article with a surrounding design in a contrasting color.

9. The method of producing a distinctive colored marking on a rubber article comprising applying to a transfer member a coloring material adapted to vulcanize in a color contrasting with the color of the article, pressing the member against the article and subjecting the member and article to vulcanizing heat, buffing the surface of the article adjacent the member before removing the member, and then removing the member, whereby a marking is produced having sharply defined edges.

10. The method of producing a distinctive colored marking on a rubber article comprising applying to a transfer member a vulcanizable rubber cement of a color contrasting with the color of the rubber of the article, said member having curved edges to retain the cement, drying the cement, pressing the member against the article and subjecting the member and article to vulcanizing heat, and removing the member.

JOHN W. BURKE.